(12) United States Patent
Fujiu

(10) Patent No.: US 9,097,309 B2
(45) Date of Patent: Aug. 4, 2015

(54) SEISMIC ISOLATION MECHANISM
(71) Applicant: OILES CORPORATION, Tokyo (JP)
(72) Inventor: Shigeo Fujiu, Ashikaga (JP)
(73) Assignee: OILES CORPORATION, Tokyo (JP)
(*) Notice: Subject to any disclaimer, the term of this patent is extended or adjusted under 35 U.S.C. 154(b) by 0 days.
(21) Appl. No.: 14/370,619
(22) PCT Filed: Jan. 7, 2013
(86) PCT No.: PCT/JP2013/000007
§ 371 (c)(1),
(2) Date: Jul. 3, 2014
(87) PCT Pub. No.: WO2013/105480
PCT Pub. Date: Jul. 18, 2013
(65) Prior Publication Data
US 2014/0360108 A1 Dec. 11, 2014
(30) Foreign Application Priority Data
Jan. 10, 2012 (JP) .................................. 2012-002208
(51) Int. Cl.
E04H 9/02 (2006.01)
F16F 15/04 (2006.01)
F16F 9/20 (2006.01)
(52) U.S. Cl.
CPC ................ F16F 15/04 (2013.01); E04H 9/022 (2013.01); F16F 9/20 (2013.01)
(58) Field of Classification Search
CPC ........... E04H 9/02; E04H 9/022; E04H 9/021; E04H 9/027; E04H 2009/026; E04B 1/36
USPC .................. 52/167.4, 167.7, 167, 8
See application file for complete search history.

(56) References Cited

U.S. PATENT DOCUMENTS 3,789,174 A * 1/1974 Barkan et al. ................. 200/294
4,617,769 A * 10/1986 Fyfe et al. ..................... 52/167.8
(Continued)

FOREIGN PATENT DOCUMENTS

| EP | 0076573 | * | 4/1983 |
| EP | 0380304 | * | 8/1990 |
| FR | 2743384 A1 | * | 7/1997 |
| JP | 09-268802 | | 10/1997 |
| JP | 10-317715 | | 12/1998 |
| JP | 2006-144476 | | 6/2006 |
| JP | 2006-291670 | | 10/2006 |

(Continued)

OTHER PUBLICATIONS

International Search Report for PCT/JP2013/000007, mailed Mar. 12, 2013.

Primary Examiner — Christine T Cajilig
(74) Attorney, Agent, or Firm — Nixon & Vanderhye P.C.

(57) ABSTRACT

A seismic isolation mechanism 1 includes a seismic isolation apparatus 6 which is installed at one end 2 in a vertical direction V on a superstructure 3 and installed at another end 4 in the vertical direction V on a floor 5 serving as a foundation or a substructure to isolate the vibration of the superstructure 3 with respect to the floor 5; an attenuation damper 10 which is connected at one end 7 in the horizontal direction H to the superstructure 3 and connected at another end 8 in the horizontal direction H to a portion 9 of the seismic isolation apparatus 6 between the one end 2 and the other end 4 thereof to attenuate the vibration of the superstructure 3 with respect to the floor 5 as it is extended and contracted in the horizontal direction H; and an attenuation damper 13 which is connected at one end 11 in the horizontal direction H to the floor 5 and connected at another end 12 in the horizontal direction H to the portion 9 of the seismic isolation apparatus 6 to attenuate the vibration of the superstructure 3 with respect to the floor 5 as it is extended and contracted in the horizontal direction H.

8 Claims, 5 Drawing Sheets

(56) References Cited

U.S. PATENT DOCUMENTS

| | | | |
|---|---|---|---|
| 4,950,528 A * | 8/1990 | Iizuka et al. | 428/212 |
| 4,991,366 A * | 2/1991 | Teramura et al. | 52/167.8 |
| 5,461,835 A * | 10/1995 | Tarics | 52/167.8 |
| 6,289,640 B1 * | 9/2001 | Ueda et al. | 52/167.9 |
| 2008/0222975 A1 * | 9/2008 | Nakata et al. | 52/167.9 |

FOREIGN PATENT DOCUMENTS

| | | | | |
|---|---|---|---|---|
| JP | 2009-127847 | 6/2009 | | |
| JP | 2010-7793 | 1/2010 | | |
| JP | 2010-007793 | 1/2010 | | |
| WO | WO 9704193 A1 * | 2/1997 | | E04B 1/98 |

* cited by examiner

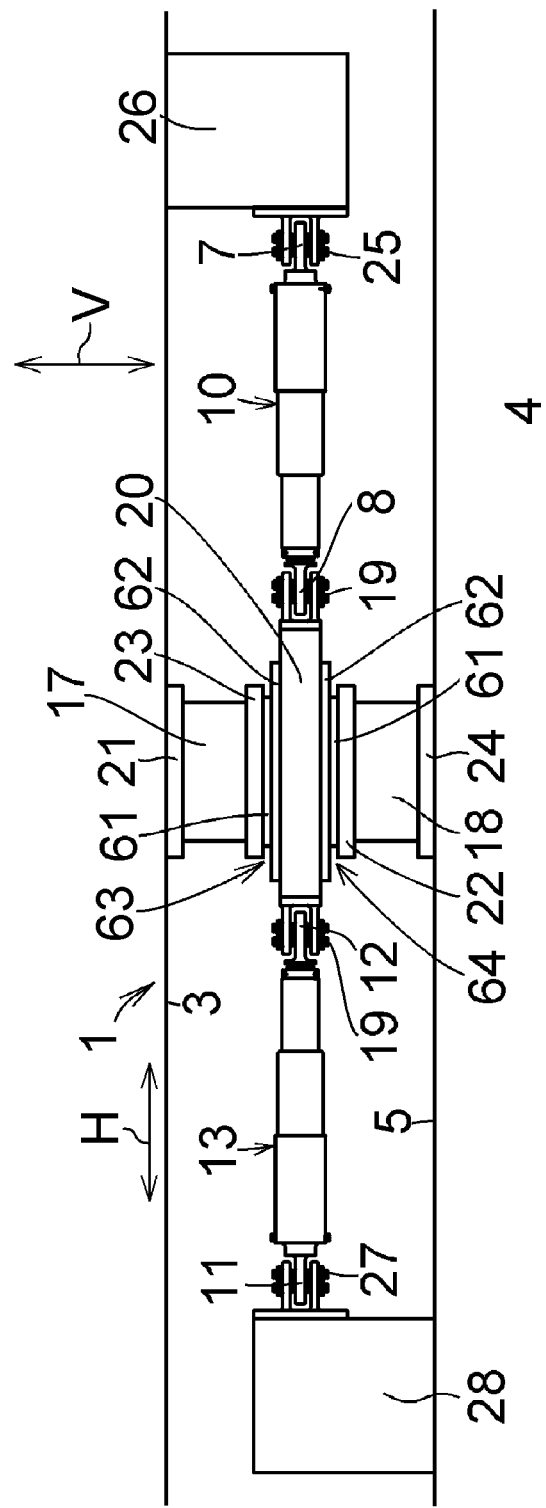

SEISMIC ISOLATION MECHANISM

This application is the U.S. national phase of International Application No. PCT/JP2013/000007, filed 7 Jan. 2013, which designated the U.S. and claims priority to JP Application 2012-002208, filed 10 Jan. 2012, the entire contents of each of which are hereby incorporated by reference.

TECHNICAL FIELD

The present invention relates to a seismic isolation mechanism for isolating the vibration of a superstructure with respect to a foundation or a substructure due to an earthquake or the like.

BACKGROUND ART

In Patent Document 1, a seismic isolation mechanism is proposed for damping horizontal vibrations in a structure, in which a seismic isolation apparatus for damping horizontal vibrations is provided between the structure and a foundation thereof, and the seismic isolation apparatus has a transmitting member which transmits to the seismic isolation apparatus the relative displacement of the structure to the foundation in the horizontal direction and allows the relative displacement in the vertical direction.

In Patent Document 2, a vibration damper is proposed which is used by being interposed between two relatively displaceable members of a building to damp the vibration of the building, and in which one damper for attenuating the vibration between the two members is connected in series to another damper which when the load applied to the one damper from the two members has exceeded a fixed value, blocks the transmission of the load to the one damper.

PRIOR ART DOCUMENTS

Patent Documents

Patent Document 1: JP-A-10-317715
Patent Document 2: JP-A-09-268802

SUMMARY OF THE INVENTION

Problems that the Invention is to Solve

Incidentally, in a case where, for example, a laminated rubber bearing with lead plugs is used as the seismic isolation mechanism, it is possible to isolate and damp the vibration with respect to the floor of a structure due to an earthquake or the like; however, if consideration is given to the occurrence of major earthquakes anticipated in the future in the Tokai, Tonankai, Nankai, and other areas, it is desired that more sufficient attenuation be ensured. In addition, also with the seismic isolation mechanism with a damping function capable of ensuring sufficient attenuation, it is desired that carrying-in and installation be facilitated.

The present invention has been devised in view of the above-described aspects, and its object is to provide a seismic isolation mechanism with a damping function which facilitates carrying-in and installation and is capable of ensuring sufficient attenuation.

Means for Solving the Problems

A seismic isolation mechanism in accordance with the present invention comprises: a seismic isolation apparatus which is installed at one vertical end thereof on a superstructure and installed at another vertical end thereof on a foundation or a substructure to isolate the vibration of the superstructure with respect to the foundation or the substructure; one attenuation damper which is connected at one horizontal end thereof to the superstructure and connected at another horizontal end thereof to a portion of the seismic isolation apparatus between the one end and the other end thereof to attenuate the vibration of the superstructure with respect to the foundation or the substructure as it is extended and contracted in a horizontal direction; and another attenuation damper which is connected at one horizontal end thereof to the foundation or the substructure and connected at another horizontal end thereof to the portion of the seismic isolation apparatus between the one end and the other end thereof to attenuate the vibration of the superstructure with respect to the foundation or the substructure as it is extended and contracted in the horizontal direction, wherein the one attenuation damper and the other attenuation damper are arranged in such a manner as to respectively extend in one direction which is a horizontal direction so that damping forces due to extension and contraction are simultaneously produced in the one attenuation damper and the other attenuation damper in the vibration of the superstructure with respect to the foundation or the substructure in the one direction.

According to the seismic isolation mechanism in accordance with the present invention, as the result of the fact that it is possible to shorten the stroke in the one direction required for the one attenuation damper and the other attenuation damper, attenuation, dampers with a long stroke are nor required, so that carrying-in and installation can be facilitated. Moreover, since damping forces are produced by both the one attenuation damper and the other attenuation damper, it is possible to ensure sufficient attenuation.

In addition, according to the seismic isolation mechanism in accordance with the present invention, since it is possible to attain a reduction in the amount of extension and contraction of the one attenuation damper and the other attenuation damper each having, for example, a cylinder and a piston rod, it is possible to preclude the possibility of occurrence of buckling of the one attenuation damper and the other attenuation damper.

In the seismic isolation mechanism in accordance with the present invention, each of the one attenuation damper and the other attenuation damper may include a cylinder body; a piston disposed in the cylinder body so as to partition an interior of the cylinder body into two chambers; an orifice passage allowing the two chambers to communicate with each other; one piston rod which is connected at one end thereof to the piston and is passed through one end portion of the cylinder body to project outside the cylinder body; another piston rod which is connected at one end thereof to the piston and is passed through another end portion of the cylinder body to project outside the cylinder body; and a fluid which is filled in the two chambers of the cylinder body.

In a preferred example of the seismic isolation mechanism in accordance with the present invention, the cylinder body of the one attenuation damper is connected to the superstructure, the other piston rod which is passed through the other end portion of the cylinder body of the one attenuation damper to project outside the cylinder body is connected to the portion between the one end and the other end of the seismic isolation apparatus, the cylinder body of the other attenuation damper is connected to the foundation or the substructure, and the other piston rod which is passed through the other end portion of the cylinder body of the other attenuation damper to project outside the cylinder body is connected to the portion between the one end and the other end of the seismic isolation apparatus.

In the seismic isolation mechanism in accordance with the present invention, the seismic isolation apparatus may include a laminated rubber seismic isolation device having at least one laminated rubber body in which a rubber elastic layer and a hard plate layer are alternately laminated. In a case where the laminated rubber seismic isolation device has two such laminated rubber bodies, one of the two laminated rubber bodies may be mounted on the superstructure at an upper end thereof serving as the one vertical end, another one of the two stacked laminated rubber bodies may be mounted on the foundation or the substructure at a lower end thereof serving as the other vertical end, and, a connecting member, to which respective other ends of the one attenuation damper and the other attenuation damper are connected and which connects these other ends and the one and the other laminated rubber bodies to each other, may be interposed between these two laminated rubber bodies stacked in the vertical direction.

In the seismic isolation mechanism in accordance with the present invention, the seismic isolation apparatus may include a sliding seismic isolation device having at least one sliding seismic isolation body constituted by a sliding member and a receiving plate which are brought into contact with each other slidably in the horizontal direction. In the case of the sliding seismic isolation device having two such sliding seismic isolation bodies, one of the two sliding seismic isolation bodies may be mounted on the superstructure at the sliding member or the receiving plate serving as the one vertical end, another one of the two sliding seismic isolation bodies may be mounted on the foundation or the substructure at the sliding member or the receiving plate serving as the other vertical end, and the connecting member, to which respective other ends of the one attenuation damper and the other attenuation damper are connected and which connects these other ends and the one and the other sliding seismic isolation bodies to each other, may be interposed between these two sliding seismic isolation bodies stacked in the vertical direction.

In addition, in the seismic isolation mechanism in accordance with the present invention, the seismic isolation apparatus may include a laminated rubber seismic isolation device having at least one pair of laminated rubber bodies in each of which the rubber elastic layer and the hard plate layer are alternately laminated and a sliding seismic isolation device having at least one sliding seismic isolation body, preferably at least one pair of sliding seismic isolation bodies, each having a sliding member and a receiving plate which is brought into contact with the sliding member slidably in the horizontal direction.

In the case where the seismic isolation apparatus includes the laminated rubber seismic isolation device having a pair of laminated rubber bodies and the sliding seismic isolation device having a pair of sliding seismic isolation bodies, the following arrangement may be provided: One of the pair of sliding seismic isolation bodies, one of the pair of laminated rubber bodies, the other one of the pair of laminated rubber bodies, and the other one of the pair of sliding seismic isolation bodies are stacked in order in the vertical direction, one of the sliding member and the receiving plate of one sliding seismic isolation body is mounted on the superstructure as the one vertical end, the other one of the sliding member and the receiving plate of the one sliding seismic isolation body is mounted on an upper end of the one laminated rubber body adjacent to the one sliding seismic isolation body in the vertical direction, one of the sliding member and the receiving plate of the other sliding seismic isolation body is mounted on the foundation or the substructure as the other vertical end, and the other one of the sliding member and the receiving plate of the other sliding seismic isolation body is mounted on a lower end of the other laminated rubber body adjacent to the other sliding seismic isolation body in the vertical direction. In this case, the connecting member, to which respective other ends of the one attenuation damper and the other attenuation damper are connected and which connects these other ends and the one and the other laminated rubber bodies to each other, may be interposed between the one and the other laminated rubber bodies adjacent to each other in the vertical direction.

Furthermore, in the seismic isolation mechanism in accordance with the present invention, in the case of the seismic isolation apparatus which includes the laminated rubber seismic isolation device having at least one pair of laminated rubber bodies in each of which a rubber elastic layer and a hard plate layer are alternately laminated and the sliding seismic isolation device having at least one pair of sliding seismic isolation bodies each having a sliding member and a receiving plate which is brought into contact with the sliding member slidably in the horizontal direction, the following arrangement may be provided: Instead of stacking one sliding seismic isolation body, one laminated rubber body, the other laminated rubber body, and the other sliding seismic isolation body in order in the vertical direction, one laminated rubber body, one sliding seismic isolation body, the other sliding seismic isolation body, and the other laminated rubber body are stacked in order in the vertical direction, an upper end of one laminated rubber body is mounted on the superstructure as the one vertical end, a lower end of the one laminated rubber body is mounted on one of the sliding member and the receiving plate of the one sliding seismic isolation body adjacent to the one laminated rubber body in the vertical direction, a lower end of the other laminated rubber body is mounted on the foundation or the substructure as the other vertical end, and an upper end of the other laminated rubber body is mounted on one of the sliding member and the receiving plate of the other sliding seismic isolation body adjacent to the other laminated rubber body in the vertical direction. In this case, the connecting member to which respective other ends of the one attenuation damper and the other attenuation damper are connected and which connects these other ends and the aforementioned other ones to each other may be interposed between other ones of the sliding members and the receiving plates of the one and the other sliding seismic isolation bodies adjacent to each other in the vertical direction. In such a case, the connecting member may be used as the other ones of the sliding members and the receiving plates in the one and the other sliding seismic isolation bodies.

In the case of the seismic isolation apparatus which includes the laminated rubber seismic isolation device having at least one pair of laminated rubber bodies and the sliding seismic isolation device having at least one pair of sliding seismic isolation bodies, the sliding member and the receiving plate of each of the pair of sliding seismic isolation bodies may be so adapted that, in the relative displacement of the superstructure with respect to the foundation or the substructure in the horizontal direction, in the case of its displacement at a fixed level or below, shear deformation in the horizontal direction is caused in each of the pair of laminated rubber bodies, while sliding in the horizontal direction is not caused between the sliding member and the receiving plate of each of the pair of sliding seismic isolation bodies, whereas in the case of its displacement at more than the fixed level, frictional resistance for causing sliding in the horizontal direction to occur between the sliding member and the receiving plate of each of the pair of sliding seismic isolation bodies is produced between mutually contacting surfaces of the sliding member and the receiving plate.

In the case where the seismic isolation apparatus includes the laminated rubber seismic isolation device having a pair of laminated rubber bodies and the sliding seismic isolation device having one sliding seismic isolation body instead of a pair of sliding seismic isolation bodies, it suffices if the seismic isolation apparatus is configured by omitting either one of the sliding seismic isolation bodies in the above-described seismic isolation apparatus having the pair of sliding seismic isolation bodies.

In the seismic isolation mechanism in accordance with the present invention having the sliding seismic isolation device, in the case where the sliding member or the receiving plate is mounted on the superstructure or on the foundation or the substructure, the superstructure, or the foundation or the substructure itself may be used as the sliding member or the receiving plate.

The seismic isolation mechanism in accordance with the present invention is used for, for example, buildings and bridges.

Advantages of the Invention

According to the present invention, it is possible to provide a seismic isolation mechanism with a damping function which facilitates carrying-in and installation and is capable of ensuring sufficient attenuation.

BRIEF DESCRIPTION OF THE DRAWINGS

FIG. 11 is a schematic view according to an alternate embodiment of the present invention.

MODE FOR CARRYING OUT THE INVENTION

Figure 1:
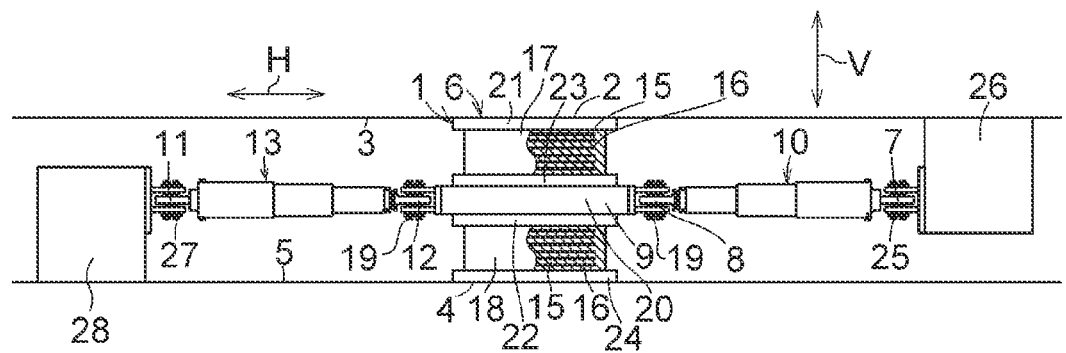
FIG. 1 is an overall explanatory view of an embodiment of the present invention.

Next, a more detailed description will be given of a mode for carrying out the invention with reference to the preferred embodiments illustrated in the drawings. It should be noted that, the invention is not limited to these embodiments.

Figure 2:
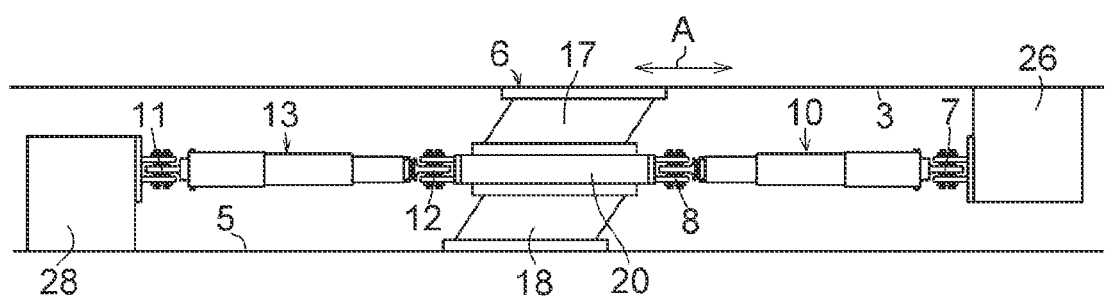
FIG. 2 is a view explaining the operation of the embodiment shown in FIG. 1.
Figure 3:
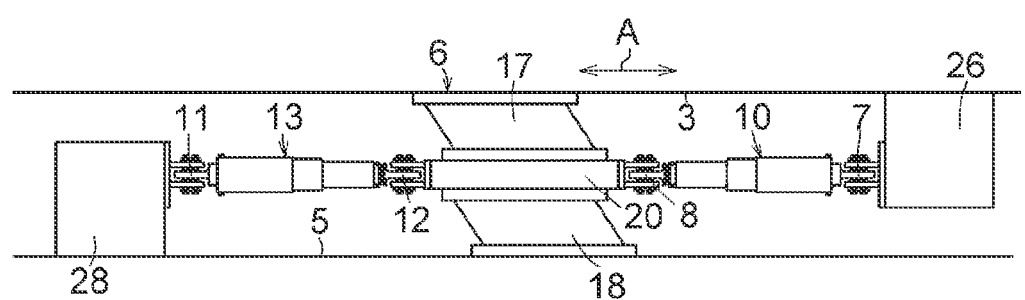
FIG. 3 is a view explaining the operation of the embodiment shown in FIG. 1.

In FIGS. 1 to 3, a seismic isolation mechanism 1 in accordance with this embodiment is comprised of a seismic isolation apparatus 6 which is installed at one end 2 in a vertical direction V on a superstructure 3 and Installed at another end 4 in the vertical direction V on a floor 5 serving as a foundation or a substructure to isolate the vibration of the superstructure 3 with respect to the floor 5; an attenuation damper 10 which Is connected at one end 7 in the horizontal direction H to the superstructure 3 and connected at another end 8 in the horizontal direction H to a portion 9 of the seismic isolation apparatus 6 between the one end 2 and the other end 4 thereof to attenuate the vibration of the superstructure 3 with respect to the floor 5 as it is extended and contracted in the horizontal direction H; and an attenuation damper 13 which is connected at one end 11 in the horizontal direction H to the floor 5 and connected at another end 12 in the horizontal direction H to the portion 9 of the seismic isolation apparatus 6 to attenuate the vibration of the superstructure 3 with respect to the floor 5 as it is extended and contracted in the horizontal direction H.

The seismic isolation apparatus 6 includes a laminated rubber seismic isolation device having two laminated rubber bodies 17 and 18 each of which is constituted by alternately laminating a rubber elastic layer 15 and a hard plate layer 16, as well as a plate-like connecting member 20 which is interposed between the laminated rubber bodies 17 and 18 and to which the respective other ends 8 and 12 of the attenuation dampers 10 and 13 are rotatably connected via a pin 19.

The laminated rubber bodies 17 and 18 are formed in a mutually similar manner in this embodiment. The laminated rubber bodies 17 and 18 are stacked on top of each other in the vertical direction V with the connecting member 20 interposed therebetween. The laminated rubber body 17 is disposed above the laminated rubber body 18 and is mounted on the superstructure 3 by means of a mounting plate 21, while the laminated rubber body 18 is disposed below the laminated rubber body 17 and is mounted on the floor 5 by means of a mounting plate 22.

The pair of hard plate layers 16 located at respective ends in the vertical direction V of the laminated rubber bodies 17 and 18 may have a larger thickness than that of the hard plate layers 16 between that pair of hard plate layers 16.

The rubber elastic layer 15 may be formed of, for example, a natural rubber or a high attenuation rubber.

The connecting member 20 is attached to each of the mounting plates 22 and 23 of the laminated rubber bodies 17 and 18.

It should be noted that lead plugs extending in the vertical direction V may be provided inside each of the laminated rubber bodies 17 and 18.

Figure 7:
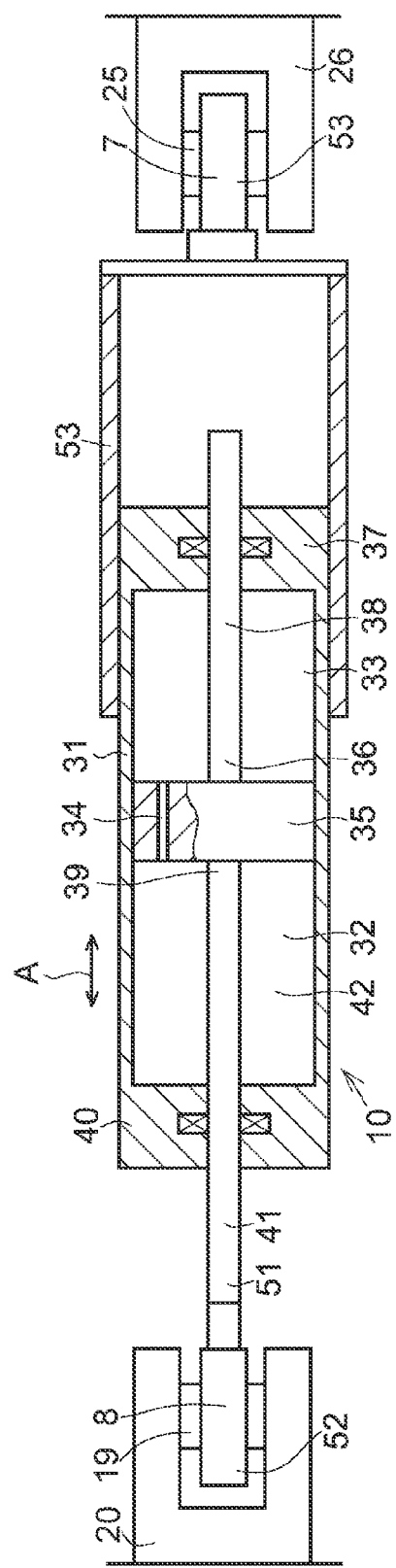
FIG. 7 is an explanatory view of mainly an attenuation damper in the respective embodiments shown in FIGS. 1 and 4.

Various dampers including such as an oil damper, a viscous damper, a steel damper, and a friction damper are used as the attenuation dampers 10 and 13 shown in FIGS. 1 to 3, but the attenuation dampers 10 and 13 may be formed, for example, as shown in FIG. 7. The attenuation dampers 10 and 13 are preferably formed in a mutually similar manner.

The attenuation damper 10 shown in FIG. 7 includes a cylinder body 31; a piston 35 disposed in the cylinder body 31 so as to partition the interior of the cylinder body 31 into two chambers 32 and 33; at least one orifice 34 provided in the piston 35 and serving as an orifice passage allowing the two chambers 32 and 33 to communicate with each other; a piston rod 38 which is connected at one end 36 to the piston 35 and is passed through one end portion 37 of the cylinder body 31 to project outside the cylinder body 31; a piston rod 41 which has the same diameter as the piston rod 38, is connected at one end 39 to the piston 35, and is passed through the other end portion 40 of the cylinder body 31 to project outside the cylinder body 31; a fluid 42, such as oil or silicone, which is filled in the two chambers 32 and 33 of the cylinder body 31; a coupling member 52 secured to the other end portion 51 of the piston rod 41; and a coupling member 53 secured to the cylinder body 31. The attenuation damper 10 is deformable in such a manner as to extend or contract in one direction A which is the horizontal direction H and the direction in which the piston rods 38 and 41 extend. The coupling member 52 is rotatably connected to the connecting member 20 by means of the pin 19, while the coupling member 53 is rotatably connected to the superstructure 3 by means of a pin 25 and a mounting member 26.

In the case where the superstructure 3 undergoes a relative displacement on one side in the direction A with respect to the floor 5, for example, as shown in FIG. 2, the attenuation damper 10 undergoes extension in the direction A, whereas in the case where the superstructure 3 undergoes a relative displacement on the other side in the direction A with respect to the floor 5, for example, as shown in FIG. 3, the attenuation damper 10 undergoes contraction in the direction A. In this extension and contraction, the kinetic energy applied to the attenuation damper 10 is attenuated as speedily as possible by the movement of the fluid 42 between the chamber 32 and the chamber 33 through the orifice 34.

Since the attenuation damper 13 is formed in the same way as the attenuation damper 10, its corresponding parts are denoted by the same reference numerals in the drawings, as required, and a detailed description thereof will be omitted. The one end 11 of the attenuation damper 13 is rotatably connected to the floor 5 by means of a pin 27 and a mounting member 28, while the other end 12 of the attenuation damper 13 is rotatably connected to the connecting member 20 by means of the pin 19. The one end 7 and the other end 8 of the attenuation damper 10 and the one end 11 and the other end 12 of the attenuation damper 13 are arranged by being aligned in the direction A. The attenuation dampers 10 and 13 are arranged tandemly in the direction A.

In the case where the superstructure 3 undergoes a relative displacement on one side in the direction A with respect to the floor 5, for example, as shown in FIG. 2, the attenuation damper 13 undergoes extension in the direction A, whereas in the case where the superstructure 3 undergoes a relative displacement on the other side in the direction A with respect to the floor 5, for example, as shown in FIG. 3, the attenuation damper 13 undergoes contraction in the direction A. In this extension and contraction, the kinetic energy applied to the attenuation damper 13 is attenuated in the same way as the above-described attenuation damper 10.

The attenuation dampers 10 and 13 are arranged between the superstructure 3 and the floor 5 in such a manner as to respectively extend in the direction A so as to simultaneously produce damping forces due to extension in the case where the superstructure 3 undergoes a relative displacement on one side in the direction A with respect to the floor 5, and so as to simultaneously produce damping forces due to contraction in the case where the superstructure 3 undergoes a relative displacement on the other side in the direction A with respect to the floor 5.

Figure 4:
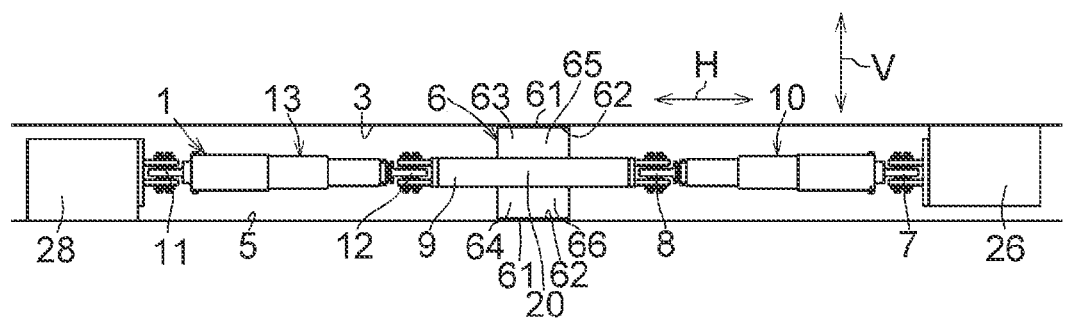
FIG. 4 is an overall explanatory view of another embodiment of the present invention.
Figure 5:
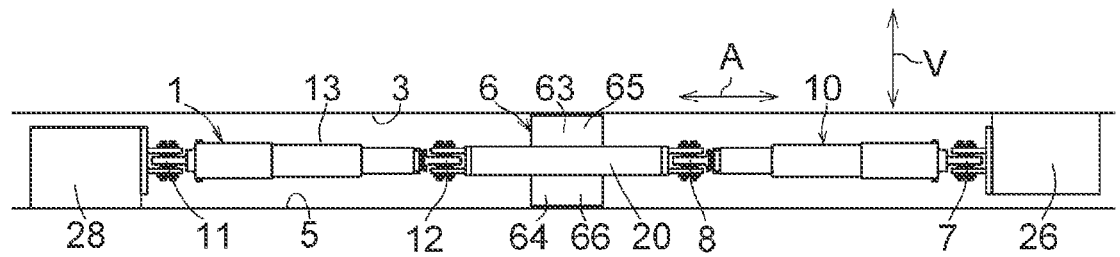
FIG. 5 is a view explaining the operation of the embodiment shown in FIG. 4.
Figure 6:
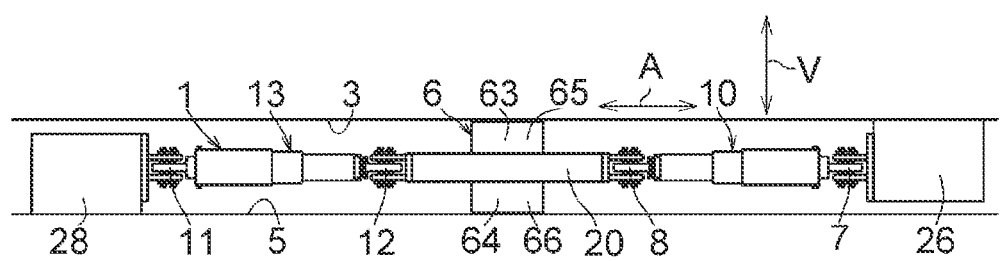
FIG. 6 is a view explaining the operation of the embodiment shown in FIG. 4.

The seismic isolation apparatus 6 may include a sliding seismic isolation device constituted by, instead of the above-described laminated rubber bodies 17 and 18, two sliding seismic isolation bodies 63 and 64 each having a sliding member 61 and a receiving plate 62 which is brought into contact with the sliding member 61 slidably in the horizontal direction H, for example, as shown in FIGS. 4 to 6.

The sliding seismic isolation bodies 63 and 64 are stacked on top of each other in the vertical direction V, and the connecting member 20 is interposed between the sliding seismic isolation bodies 63 and 64. The sliding member 61 of the sliding seismic isolation body 63 disposed above the sliding seismic isolation body 64 in the vertical direction V is secured to a support 65. The support 65 is mounted on the connecting member 20. The receiving plate 62 of the sliding seismic isolation body 63 is mounted on the superstructure 3, and is in contact with the sliding member 61 slidably in the horizontal direction H.

The sliding member 61 of the sliding seismic isolation body 64 disposed below the sliding seismic isolation body 63 in the vertical direction V is secured to a support 66. The support 66 is mounted on the connecting member 20. The receiving plate 62 of the sliding seismic isolation body 64 is mounted on the floor 5, and is in contact with the sliding member 61 slidably in the horizontal direction H.

In the case where vibration occurs in the superstructure 3 with respect to the floor 5 in the direction A, for example, as shown in FIGS. 5 and 6, each of the sliding seismic isolation bodies 63 and 64 is adapted such that the sliding member 61 slides with respect to the receiving plate 62, and the kinetic energy is absorbed by frictional heat caused by frictional resistance during this sliding.

Figure 8:
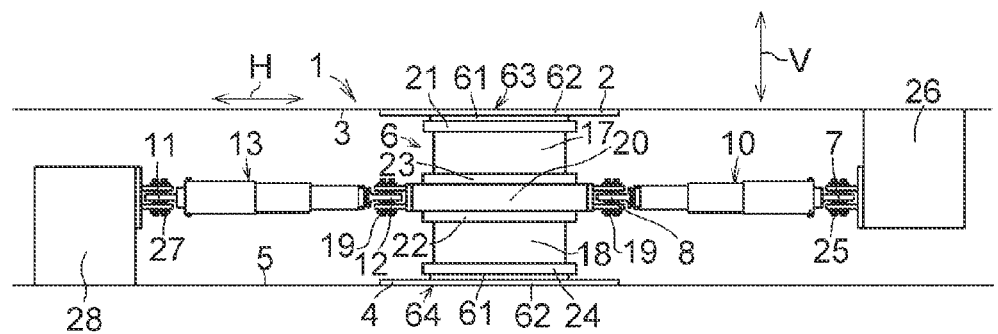
FIG. 8 is an overall explanatory view of still another embodiment of the present invention.
Figure 9:
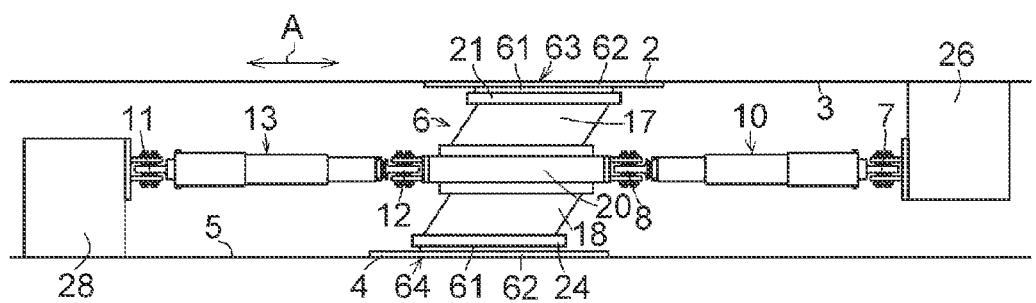
FIG. 9 is a view explaining the operation of the embodiment shown in FIG. 8.
Figure 10:
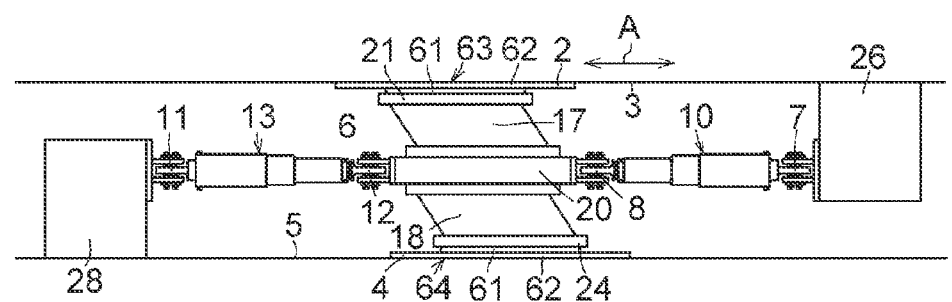
FIG. 10 is a view explaining the operation of the embodiment shown in FIG. 8.

Although, in the above-described seismic isolation mechanism 1, the seismic isolation apparatus 6 is configured by the laminated rubber seismic isolation device having the two laminated rubber bodies 17 and 18 or the sliding seismic isolation device having the two sliding seismic isolation bodies 63 and 64, the seismic isolation apparatus 6 may alternatively be configured by the laminated rubber seismic isolation device having the two laminated rubber bodies 17 and 18 and the sliding seismic isolation device having the two sliding seismic isolation bodies 63 and 64, for example, as shown in FIGS. 8 to 10. In this case, the seismic isolation mechanism 1 may be configured as follows: The sliding seismic isolation body 63, the laminated rubber body 17, the laminated rubber body 18, and the sliding seismic isolation body 64 are stacked in order in the vertical direction V, the receiving plate 62 of the sliding seismic isolation body 63 is mounted on the superstructure 3 as the one end 2 in the vertical direction, the sliding member 61 of the sliding seismic isolation body 63 is mounted on the mounting plate 21 at the upper end of the laminated rubber body 17 adjacent to that sliding seismic isolation body 63 in the vertical direction V, the receiving plate 62 of the sliding seismic isolation body 64 is mounted on the floor 5 as the other end 4 in the vertical direction V, and the sliding member 61 of the sliding seismic isolation body 64 is mounted on the mounting plate 24 at the lower end of the laminated rubber body 18 adjacent to that sliding seismic isolation body 64 in the vertical direction V. Further, the connecting member 20 for connecting to the respective other ends 8 and 12 of the attenuation dampers 10 and 13 and for mutually connecting these other ends 8 and 12 and the mounting plates 23 and 22 of the laminated rubber bodies 17 and 18 is interposed between the mounting plates 23 and 22 of the laminated rubber bodies 17 and 18 which are adjacent to each other in the vertical direction V. Furthermore, the coefficient of friction of the mutually contacting surfaces of the sliding member 61 and the receiving plate 62 is set such that in the relative displacement of the superstructure 3 with respect to the floor 5 in the horizontal direction H, in the case of its displacement at a fixed level or below, shear deformation in the horizontal direction H is caused in the laminated rubber bodies 17 and 18, as shown in FIGS. 9 and 10, whereas in the case of its displacement at more than the fixed level, frictional resistance for causing sliding in the horizontal direction H to occur between the sliding member 61 and the receiving plate 62 of the sliding seismic isolation body 63 and between the sliding member 61 and the receiving plate 62 of the sliding seismic isolation body 64 is produced between the mutually contacting surfaces of the sliding member 61 and the receiving member 62 of each of the sliding seismic isolation bodies 63 and 64. In addition, the sliding seismic isolation device may have the two sliding seismic isolation bodies 63 and 64, the sliding seismic isolation body 63 being interposed between the laminated rubber body 17 and the connecting member 20 in the vertical direction V, and the sliding seismic isolation body 64 being interposed between the connecting member 20 and the laminated rubber body 18 in the vertical direction V, for example, as shown in FIG. 11.

In addition, although, in the above, the sliding members 61 are provided in addition to the mounting plates 21 and 24, such mounting plates 21 and 24 may be used as the sliding members, and, in other words, the sliding seismic isolation device may be configured by using the mounting plates 21 and 24 as the sliding members or the receiving plates.

According to the above-described seismic isolation mechanism 1, the seismic isolation mechanism 1 is comprised of the seismic isolation apparatus 6 which is installed at the one end 2 in the vertical direction V on the superstructure 3 and installed at the other end 4 In the vertical direction V on the floor 5 to isolate the vibration of the superstructure 3 with respect to the floor 5; the one attenuation damper 10 which is connected at the one end 7 in the horizontal direction H to the superstructure 3 and connected at the other end 8 to the portion 9 of the seismic isolation apparatus 6 between the one end 2 and the other end 4 thereof to attenuate the vibration of the superstructure 3 with respect to the floor 5 as it is extended and contracted in the horizontal direction H; and the other attenuation damper 13 which is connected at the one end 11 in the horizontal direction H to the floor 5 and connected at the other end 12 to the portion 9 of the seismic isolation apparatus 6 between the one end 2 and the other end 4 thereof to attenuate the vibration of the superstructure 3 with respect to the floor 5 as it is extended and contracted in the horizontal direction H, the attenuation damper 10 and the attenuation damper 13 being arranged in such a manner as to extend in one direction A which is the horizontal direction H so that damping forces due to extension and contraction are simultaneously produced in the attenuation dampers 10 and 13 in the vibration of the superstructure 3 with respect to the floor 5 in the direction A. Accordingly, as the result of the tact that it is possible to shorten the stroke in the direction A required for each of the attenuation dampers 10 and 13, attenuation dampers with a long stroke are not required, so that carrying-in and installation can be facilitated. Moreover, since clamping forces are produced by both the attenuation dampers 10 and 13, it is possible to ensure sufficient attenuation. In addition, according to the seismic isolation mechanism 1, since it is possible to attain the shortening of the stroke of the attenuation dampers 10 and 13 each having, for example, the cylinder and the piston rod, it is possible to preclude the possibility of occurrence of buckling of these attenuation dampers 10 and 13.

DESCRIPTION OF REFERENCE NUMERALS AND SIGNS

1: seismic isolation mechanism
3: superstructure
5: floor
6: seismic isolation apparatus
10, 13: attenuation damper

The invention claimed is:

1. A seismic isolation mechanism comprising: a seismic isolation apparatus which is installed at one vertical end thereof on a superstructure and installed at another vertical end thereof on a foundation or a substructure to isolate the vibration of the superstructure with respect to the foundation or the substructure; one attenuation damper which is connected at one horizontal end thereof to the superstructure and connected at another horizontal end thereof to a portion of the seismic isolation apparatus between the one vertical end and the other vertical end thereof to attenuate the vibration of the superstructure with respect to the foundation or the substructure due to horizontal extension and contraction of the one attenuation damper; and another attenuation damper which is connected at one horizontal end thereof to the foundation or the substructure and connected at another horizontal end thereof to the portion of the seismic isolation apparatus between the one vertical end and the other vertical end thereof to attenuate the vibration of the superstructure with respect to the foundation or the substructure due to horizontal extension and contraction of the other attenuation damper, wherein said one attenuation damper and said other attenuation damper are arranged in such a manner as to respectively extend in one direction which is a horizontal direction so that damping forces due to extension and contraction are simultaneously produced in said one attenuation damper and said other attenuation damper in the vibration of the superstructure with respect to the foundation or the substructure in the one direction, wherein said seismic isolation apparatus includes a laminated rubber seismic isolation device having at least one laminated rubber body in which a rubber elastic layer and a hard plate layer are alternately laminated, wherein said laminated rubber seismic isolation device has at least two laminated rubber bodies, one of the two laminated rubber bodies being mounted on the superstructure, another one of the two laminated rubber bodies being mounted on the foundation or the substructure, a connecting member to which respective other ends of said one attenuation damper and said other attenuation damper are connected being interposed between the two laminated rubber bodies, and wherein said seismic isolation apparatus includes a sliding seismic isolation device having at least one sliding seismic isolation body constituted by a sliding member and a receiving plate which are brought into contact with each other slidably in the horizontal direction, and said sliding seismic isolation device is interposed between the two laminated rubber bodies in a vertical direction.

2. The seismic isolation mechanism according to claim 1, wherein each of said one attenuation damper and said other attenuation damper includes a cylinder body; a piston disposed in the cylinder body so as to partition an interior of the cylinder body into two chambers; an orifice passage allowing the two chambers to communicate with each other; one piston rod which is connected at one end thereof to the piston and is passed through one end portion of the cylinder body to project outside the cylinder body; another piston rod which is connected at one end thereof to the piston and is passed through another end portion of the cylinder body to project outside the cylinder body; and a fluid which is filled in the two chambers of the cylinder body.

3. The seismic isolation mechanism according to claim 2, wherein the cylinder body of said one attenuation damper is connected to the superstructure, the other piston rod which is passed through the other end portion of the cylinder body of said one attenuation damper to project outside the cylinder body is connected to the portion between the one vertical end and the other vertical end of the seismic isolation apparatus, the cylinder body of said other attenuation damper is connected to the foundation or the substructure, and the other piston rod which is passed through the other end portion of the cylinder body of said other attenuation damper to project outside the cylinder body is connected to the portion between the one vertical end and the other vertical end of the seismic isolation apparatus.

4. The seismic isolation mechanism according to claim 1, wherein said sliding seismic isolation device has at least two sliding seismic isolation bodies, one of the two sliding seismic isolation bodies being interposed between the one laminated rubber body and said connecting member in a vertical direction, another one of the two sliding seismic isolation bodies being interposed between said connecting member and the other laminated rubber body in the vertical direction.

5. A seismic isolation mechanism comprising: a seismic isolation apparatus which is installed at one vertical end thereof on a superstructure and installed at another vertical end thereof on a foundation or a substructure to isolate the vibration of the superstructure with respect to the foundation or the substructure; one attenuation damper which is connected at one horizontal end thereof to the superstructure and connected at another and the other vertical end thereof to attenuate the vibration of the superstructure with respect to the foundation or the substructure due to horizontal extension and contraction of the one attenuation damper; and another attenuation damper which is connected at one horizontal end thereof to the foundation or the substructure and connected at another horizontal end thereof to the portion of the seismic isolation apparatus between the one vertical end and the other vertical end thereof to attenuate the vibration of the superstructure with respect to the foundation or the substructure due to horizontal extension and contraction of the other attenuation damper, wherein said one attenuation damper and said other attenuation damper are arranged in such a manner as to respectively extend in one direction which is a horizontal direction so that damping forces due to extension and contraction are simultaneously produced in said one attenuation damper and said other attenuation damper in the vibration of the superstructure with respect to the foundation or the substructure in the one direction, wherein said seismic isolation apparatus includes a sliding seismic isolation device having at least one sliding seismic isolation body which comprises a sliding member and a receiving plate adapted to be brought into contact with the sliding member slidably in the horizontal direction, and wherein said sliding seismic isolation device has at least two sliding seismic isolation bodies, one of the two sliding seismic isolation bodies being mounted on the superstructure, another one of the two sliding seismic isolation bodies hem n mounted on the foundation or the substructure, a connecting member to which respective other ends of said one attenuation damper and said other attenuation damper are connected being interposed between the two sliding seismic isolation bodies.

6. The seismic isolation mechanism according to claim 5, wherein said seismic isolation apparatus includes a laminated rubber seismic isolation device having at least one laminated rubber body in which a rubber elastic layer and a hard plate layer are alternately laminated, and said laminated rubber seismic isolation device is interposed between the two sliding seismic isolation bodies in the vertical direction.

7. The seismic isolation mechanism according to claim 6, wherein said laminated rubber seismic isolation device has at least two laminated rubber bodies, one of the two laminated rubber bodies being interposed between one of the sliding seismic isolation bodies and said connecting member in the vertical direction, another one of the two laminated rubber bodies being interposed between said connecting member and another one of the sliding seismic isolation bodies in the vertical direction.

8. The seismic isolation mechanism according to claim 6, wherein the sliding member and the receiving plate of each of the two sliding seismic isolation bodies are so adapted that, in the relative displacement of the superstructure with respect to the foundation or the substructure in the horizontal direction, in the case of its displacement at a fixed level or below, shear deformation in the horizontal direction is caused in each of the two laminated rubber bodies, while sliding in the horizontal direction is not caused between the sliding member and the receiving plate, and in the case of its displacement at more than the fixed level, frictional resistance for causing sliding in the horizontal direction to occur between the sliding member and the receiving plate is produced between mutually contacting surfaces of the sliding member and the receiving plate.

* * * * *

UNITED STATES PATENT AND TRADEMARK OFFICE
CERTIFICATE OF CORRECTION

PATENT NO. : 9,097,309 B2  
APPLICATION NO. : 14/370619  
DATED : August 4, 2015  
INVENTOR(S) : Fujiu Page 1 of 1

It is certified that error appears in the above-identified patent and that said Letters Patent is hereby corrected as shown below:

In the Claims

Claim 5, column 11, line 20, "connected at another and the other vertical end" should read "connected at another horizontal end thereof to a portion of the seismic isolation apparatus between the one vertical end and the other vertical end"; and Claim 5, column 12, line 8, "isolation bodies hem n mounted on the foundation" should read "isolation bodies being mounted on the foundation."

Signed and Sealed this  
Fifth Day of July, 2016

Michelle K. Lee  
*Director of the United States Patent and Trademark Office*